United States Patent
Ferentz

(10) Patent No.: US 10,025,362 B2
(45) Date of Patent: Jul. 17, 2018

(54) REMOTE POWERING SYSTEM AND METHOD

(71) Applicant: Microsemi P.O.E Ltd., Hod Hasharon (IL)

(72) Inventor: Alon Ferentz, Petach Tikva (IL)

(73) Assignee: Microsemi P.O.E Ltd., Hod Hasharon (IL)

( * ) Notice: Subject to any disclaimer, the term of this patent is extended or adjusted under 35 U.S.C. 154(b) by 125 days.

(21) Appl. No.: 15/366,004

(22) Filed: Dec. 1, 2016

(65) Prior Publication Data

US 2017/0177051 A1    Jun. 22, 2017

Related U.S. Application Data

(60) Provisional application No. 62/268,518, filed on Dec. 17, 2015.

(51) Int. Cl.
*G06F 1/00* (2006.01)
*G06F 1/26* (2006.01)
*G06F 1/30* (2006.01)

(52) U.S. Cl.
CPC .............. *G06F 1/266* (2013.01); *G06F 1/305* (2013.01)

(58) Field of Classification Search
CPC ................................. G06F 1/266; G06F 1/305
USPC ...................... 713/300, 320, 340; 307/1, 113
See application file for complete search history.

(56) References Cited

U.S. PATENT DOCUMENTS

| | | | |
|---|---|---|---|
| 7,849,343 B2 | 12/2010 | Ferentz | |
| 8,149,602 B2 | 4/2012 | Darshan | |
| 9,281,691 B2 | 3/2016 | Ferentz | |
| 9,377,794 B1 | 6/2016 | Dwelley et al. | |
| 2007/0220618 A1* | 9/2007 | Holmes | G06F 1/266 726/36 |
| 2009/0327766 A1* | 12/2009 | Ghoshal | G06F 1/266 713/300 |
| 2010/0052421 A1* | 3/2010 | Schindler | H02J 1/14 307/35 |

(Continued)

OTHER PUBLICATIONS

Extended European Search Report for EP16203605.7 dated May 15, 2017 by the European Patent Office.

(Continued)

*Primary Examiner* — Aurel Prifti
(74) *Attorney, Agent, or Firm* — Simon Kahn

(57) ABSTRACT

A PoE system PSE, constituted of: a power source input; a classification functionality arranged to determine the class of a PD; a memory arranged to store thereon the determined class; a timing functionality arranged to output the length of a power interruption to the power source input; and a control circuitry; wherein, responsive to an indication of the timing functionality that the power interruption length is greater than a predetermined time value, the control circuitry is arranged to initiate the class determination of the classification functionality, and wherein, responsive to an indication of the timing functionality that the power interruption length is not greater than the predetermined time value, the control circuitry is arranged to: supply power from the power source input to the PD responsive to the stored determined class; and not initiate the class determination of the classification functionality prior to the power supplying.

12 Claims, 4 Drawing Sheets

(56) References Cited

U.S. PATENT DOCUMENTS

| | | | |
|---|---|---|---|
| 2010/0095136 A1* | 4/2010 | Karam | G06F 1/266 |
| | | | 713/300 |
| 2012/0131372 A1* | 5/2012 | Hibi | H04L 12/10 |
| | | | 713/340 |
| 2012/0223650 A1* | 9/2012 | Radermacher | H05B 37/0254 |
| | | | 315/200 R |
| 2012/0284538 A1* | 11/2012 | Linne | H02J 1/08 |
| | | | 713/300 |
| 2014/0053011 A1 | 2/2014 | Diab | |
| 2014/0208140 A1* | 7/2014 | Brooks | G06F 1/28 |
| | | | 713/320 |
| 2014/0258738 A1* | 9/2014 | Greenwalt | G06F 1/3206 |
| | | | 713/300 |
| 2015/0061762 A1* | 3/2015 | Charlon | H03F 1/3258 |
| | | | 330/149 |
| 2015/0372826 A1 | 12/2015 | Blaut et al. | |
| 2016/0056967 A1 | 2/2016 | Ohana | |
| 2016/0172851 A1* | 6/2016 | Wendt | H02J 1/00 |
| | | | 307/113 |
| 2016/0204949 A1* | 7/2016 | Theunissen | H04L 12/10 |
| | | | 307/1 |

OTHER PUBLICATIONS

IEEE Computer Society; "IEEE std 802.af-2003"; pp. 29-57, 94-96, 102, 115; published Jun. 18, 2003; The Institute of Electrical and Electronic Engineers, Inc., New York, NY, 2003.

IEEE Computer Society; "IEEE std 802.at-2009"; pp. 22-67; published Oct. 30, 2009; The Institute of Electrical and Electronic Engineers, Inc., New York, NY, 2003.

HDBaseT Alliance; "HDBasetT Specification Version 1.1.0", pp. 151-187; published Jul. 12, 2011, HD BaseT Alliance, Beaverton, Oregon.

* cited by examiner

REMOTE POWERING SYSTEM AND METHOD

TECHNICAL FIELD

The invention relates generally to the field of remote powering and particularly to a remote powering apparatus and method suitable for large lighting systems.

BACKGROUND

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). The power sourcing equipment is configured to detect the PD by ascertaining a valid signature resistance, and to supply power over the 2 twisted wire pairs only after a valid signature resistance is actually detected.

The HD BaseT Alliance of Beaverton, Oreg. has published the HDBaseT Specification Version 1.1.0 which defines a high power standard utilizing twisted wire pair cabling, such as Category 5e (CAT 5e) or Category 6 (CAT 6) structured cabling as defined by ANSI/TIA/EIA-568-A. The specification provides for even higher power than the above mentioned IEEE 802.3at-2009 over each set of 2 pairs, with all 4 pairs utilized for powering, and allows for power over structured communication cabling from any of: a type 1 PSE, denoted hereinafter as a low power PSE, typically meeting the above mentioned IEEE 802.3af standard; a type 2 PSE denoted hereinafter as a medium power PSE, typically meeting the above mentioned IEEE 802.3at standard; a type 3 PSE, denoted hereinafter as a high power PSE, typically meeting the above HDBaseT specification; twin medium power PSEs; and twin high power PSEs.

In the PoE process, a valid device detection is first performed. This detection process identifies whether or not the PSE is connected to a valid PD to ensure that power is not applied to non-PoE capable devices. After a valid PD is discovered, the PSE can optionally perform a power classification. For example, in the IEEE 802.3af standard, the classification step identifies a power classification of the PD from among a variety of power classes. After the classification process is complete, the PSE is arranged to allocate power to the port in accordance with the power classification. Particularly, the PSE is arranged to provide power to a detected PD only if it is determined that enough power, as indicated by the classification, is available to be allocated.

Recently, an interest has developed to utilize PoE to power lighting systems. One disadvantage of powering lighting systems with PoE is the amount of time the PoE system takes to restart after a power outage. Particularly, a 24 port PoE hub can take up to 15 seconds to start up all ports, including the detection and classification stages, which is an extremely long amount of time for lighting systems.

SUMMARY OF THE INVENTION

Accordingly, it is a principal object of the present invention to overcome at least some of the disadvantages of prior art PoE powering systems. This is accomplished in one embodiment by a PoE system comprising a PSE in electrical communication with a PD, the PSE comprising: a PSE control circuitry; a power source input arranged to receive an input power; a classification functionality, responsive to the PSE control circuitry and arranged to identify a class of the PD; a PSE memory; and a PSE timing functionality in communication with the PSE control circuitry and arranged to output an indication of the length of an interruption in receipt of the input power to the power source input, wherein the PSE control circuitry is arranged to: control the classification functionality to identify, prior to the power interruption, the class of the PD; store information regarding the identified class of the PD on the PSE memory; and supply power to the PD, responsive to the identified class, prior to the power interruption, wherein, responsive to the indication of the PSE timing functionality that the power interruption length was greater than a predetermined time value, the PSE control circuitry is arranged to: control the classification functionality to identify, subsequent to the power interruption, the class of the PD; and supply power to the PD, subsequent to the power interruption, responsive to the subsequent identified class of the PD, and wherein, responsive to the indication of the PSE timing functionality that the power interruption length was not greater than the predetermined time value, the PSE control circuitry is arranged to: supply power to the PD, subsequent to the power interruption, responsive to the stored identified class; and not initiate the class identification of the classification functionality prior to the power supplying.

In one embodiment the PSE further comprises a detection functionality in electrical communication with the PSE control circuitry and arranged to detect whether a PD having a resistance within a predetermined range, denoted a valid PD, is connected to the PSE, the PSE control circuitry further arranged to: responsive to the indication of the PSE timing functionality that the power interruption length was greater than the predetermined value, control the detection functionality to initiate the valid PD detection prior to the supply of power to the PD subsequent to the power interruption, and responsive to an indication of the PSE timing functionality that the power interruption length is not greater than the predetermined value, not initiate the valid PD detection of the detection circuitry prior to the supply of power to the PD subsequent to the power interruption.

In one embodiment the PSE control circuitry is further arranged to determine the status of an installation flag, wherein the supply of power without the class determination is responsive to the installation flag being in a cleared state. In another embodiment the PSE timing functionality comprises a capacitor, the PSE timing functionality arranged to determine the voltage across the capacitor, wherein the power interruption length determination is responsive to the determined voltage.

In one embodiment the PSE timing functionality is further arranged to: create a first time stamp responsive to a detection of the power interruption; and create a second time stamp responsive to a detection of an end of the power interruption, wherein the power interruption length determination is responsive to a difference between the created second time stamp and the created first time stamp. In another embodiment the system further comprises the PD, the PD comprising: a PD power input arranged to receive power from the PSE; a PD memory; and a PD control circuitry, wherein the PD control circuitry is arranged, responsive to the class determination, to store information regarding a type of the PSE on the PD memory.

Independently, the embodiments herein enable a remote powering method, the method comprising: identifying, prior to a power interruption event, the class of a powered device (PD) in electrical communication with a power sourcing equipment (PSE); storing information regarding the identified PD class on a PSE memory; supplying power to the PD, prior to the power interruption event, responsive to the identified PD class; determining the length of the power interruption event; in the event that the determined power interruption length is greater than a predetermined time value: identifying, subsequent to the power interruption event, the class of the PD; and supplying power to the PD, subsequent to the power interruption event, responsive to the subsequent identified class of the PD, in the event that the power interruption length is not greater than the predetermined time value: supplying power to the PD, subsequent to the power interruption, responsive to the stored identified class, without identifying, subsequent to the power interruption event, the class of the PD.

In one embodiment, the method further comprises: in the event that the determined power interruption length is greater than the predetermined time value, initiating a detection stage to identify that a PD having a resistance within a predetermined range is in electrical communication with the PSE, prior to the supplying power to the PD subsequent to the power interruption event; and in the event that the power interruption length is not greater than the predetermined time value, the supplying power to the PD subsequent to the power interruption event is without initiating the detection stage subsequent to the power interruption event.

In one embodiment the method further comprises determining the status of an installation flag, wherein the supplying power to the PD, subsequent to the power interruption, responsive to the stored identified class, without identifying, subsequent to the power interruption event, the class of the PD, is responsive to the installation flag being in a cleared state. In another embodiment the method further comprises determining a voltage across a capacitor, the power interruption length determination responsive to the determined voltage.

In one embodiment the method further comprises: creating a first time stamp responsive to a detection of a beginning of the power interruption event; and creating a second time stamp responsive to a detection of an end of the power interruption event, wherein the power interruption length determination is responsive to a difference between the created second time stamp and the created first time stamp. In another embodiment the method further comprises, responsive to the identifying, prior to the power interruption event, the class of the PD: storing information regarding a type of the PSE on a PD memory.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
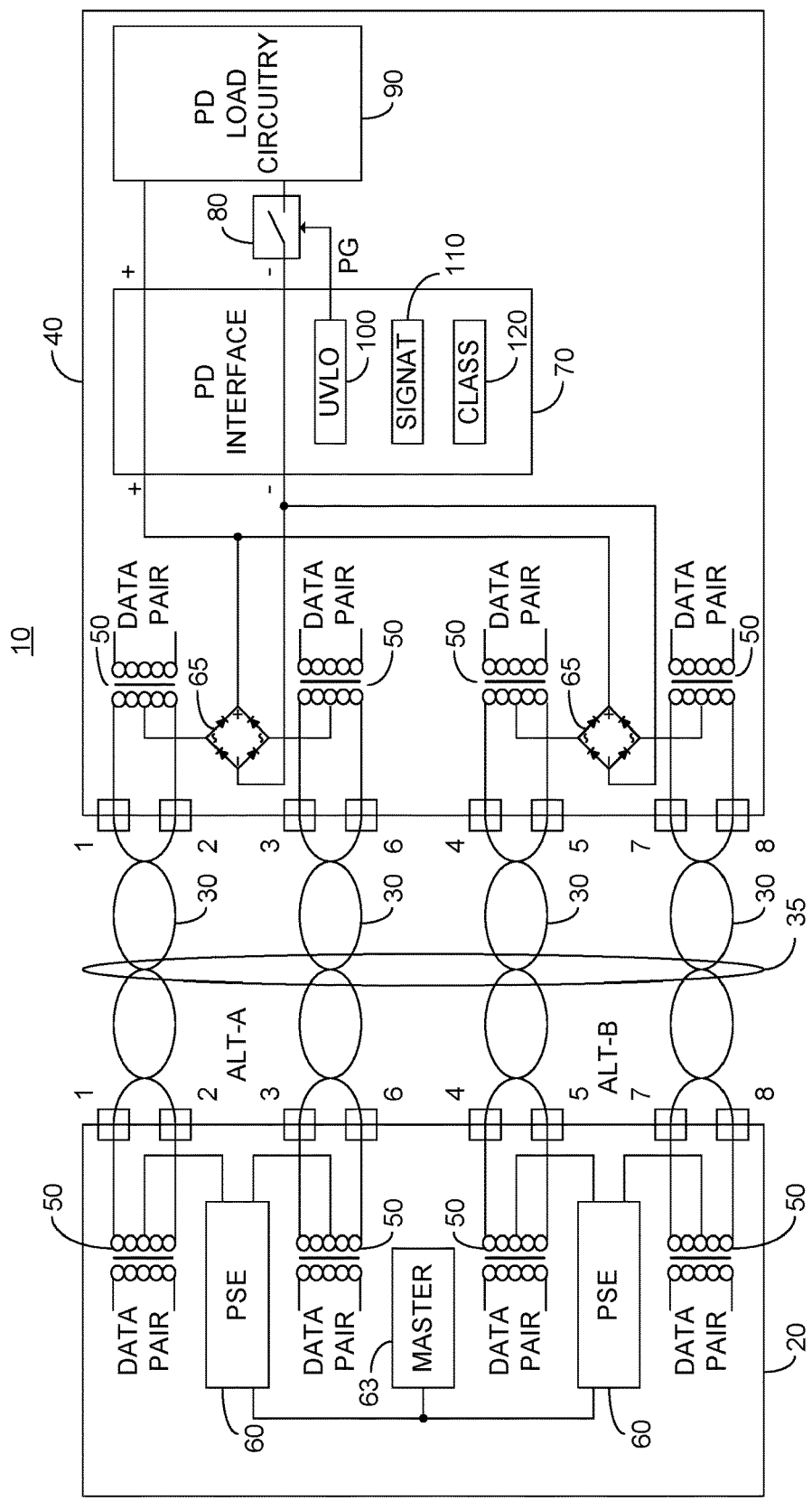
FIGS. 1A-1C illustrate high level diagram of various portions of a PoE powering arrangement, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The description below is particularly enabled in a power over Ethernet environment, however this is not meant to be limiting in any way. The teachings herein are equally applicable to reverse powering systems, and remote powering utilizing less than multiple twisted wire pairs, including, without limitation, powering over a single wire pair.

Figure 1B:
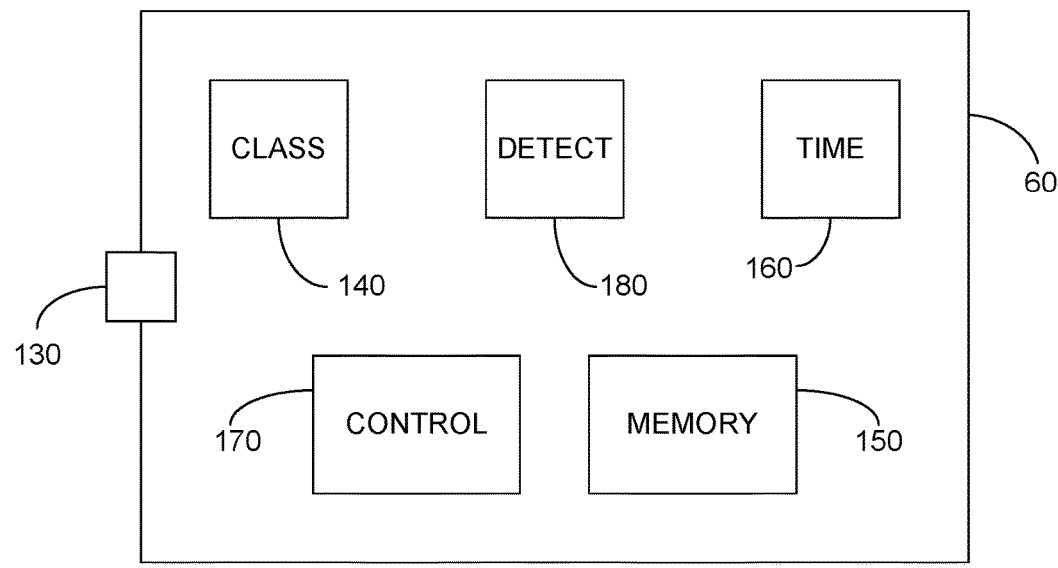

FIG. 1A illustrates a high level block diagram of a PoE powering arrangement 10, according to certain embodiments. PoE powering arrangement 10 comprises: a switch/hub 20; a plurality of twisted wire pairs 30 constituted within a structured cable 35; and a PD 40. Switch/hub 20 comprises a plurality of data transformers 50, a first and a second PSE 60 and a master control 63. PD 40 comprises: a plurality of data transformers 50; a first and a second diode bridge 65; a PD interface 70; an electronically controlled switch 80; and a PD load circuitry 90. PD interface 70 comprises: an under-voltage lockout (UVLO) circuit 100; a signature impedance 110; and a class current source 120. Optionally, a class event counter is further supplied (not shown). As illustrated in FIG. 1B, PSE 60 comprises: a power source input 130; a classification functionality 140; a PSE memory 150; a PSE timing functionality 160; a PSE control circuitry 170; and a detection functionality 180. In one embodiment, PSE memory 150 is a non-volatile memory.

Figure 1C:
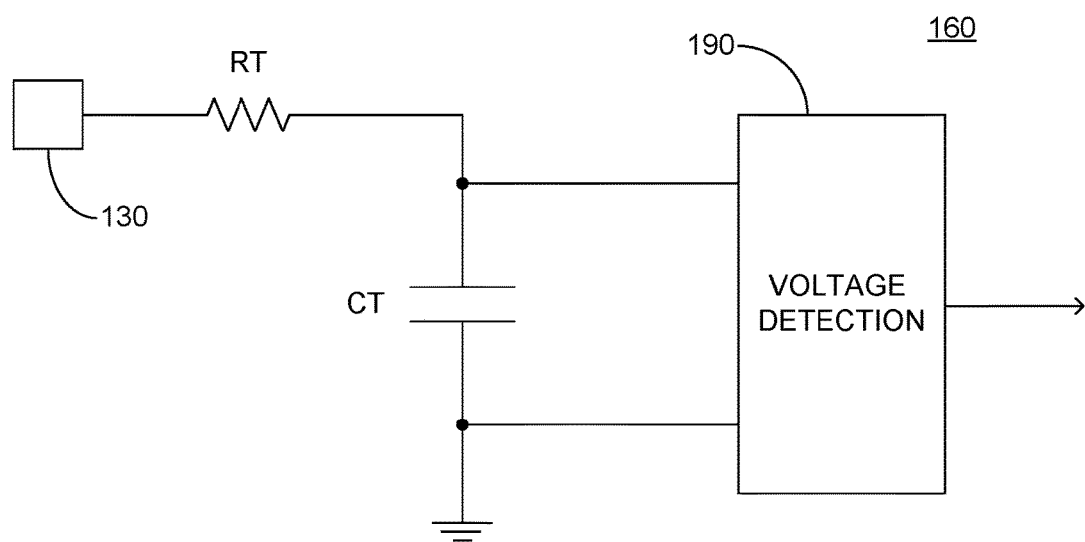

Each of classification functionality 140, PSE memory 150, PSE timing functionality 160, PSE control circuitry 170 and detection functionality 180 may be constituted in a dedicated circuitry, or as a programmed functionality for a computing element, without limitation. Additionally, each of classification functionality 140, PSE timing functionality 160 and detection functionality 180 may either be part of PSE control circuitry 170 or be provided as a separate element. In one embodiment, as illustrated in FIG. 1C, PSE timing functionality 160 comprises: a resistor RT; a capacitor CT; and a voltage detection circuitry 190. In such an embodiment, a first end of resistor RT is coupled to power source input 130 and a second end of resistor RT is coupled to a first end of capacitor CT. A second end of capacitor CT is coupled to a common potential. Voltage detection circuitry 190 is arranged to detect the voltage across capacitor CT. Each PSE control circuitry 170 is responsive to master control 63 (connection not shown). In another embodiment, PSE timing circuitry 160 comprises a real-time clock. In one embodiment, a selected control circuitry 170 further acts as master control 63 and communicates commands to other associated control circuitries 170.

A data pair is connected across the primary winding of each data transformer 50 in switch/hub 20 and a first end of each twisted wire pair 30 is connected across the secondary winding of each data transformer 50 in switch/hub 20 via respective connections, listed conventionally in two groups: connections 1, 2, 3, 6, denoted ALT-A, where power is thus delivered over a first set of wires; and connections 4, 5, 7 and 8, denoted ALT-B, where power is thus delivered over a second set of wires. A first output of first PSE 60, representing the positive polarity, is coupled to the center taps of the secondary windings of data transformers 50 of switch/hub 20 connected to twisted wire pairs 30 via connections 1 and 2 and a return of first PSE 60 is coupled to the center taps of the secondary windings of data transformers 50 of switch/hub 20 connected to twisted wire pairs 30 via connections 3 and 6. A first output of second PSE 60, representing the positive polarity, is coupled to the center taps of the secondary windings of data transformers 50 of switch/hub 20 connected to twisted wire pairs 30 via connections 4 and 5; and a return of second PSE 60 is coupled to the center taps of the secondary windings of data transformers 50 of switch/hub 20 connected to twisted wire pairs 30 via connections 7 and 8. The powering arrangement associated with first PSE 60 is conventionally known as ALT-A powering, i.e. wherein powering is provided over the set of wire pairs associated with connections 1, 2, 3 and 6; and powering from second PSE 60 is conventionally known as ALT-B powering, i.e. wherein powering is provided over the set of wire pairs associated with connections 4, 5, 7 and 8. Optionally, powering can be provided simultaneously by both PSEs 60 to PD 40. In another embodiment (not shown), a pair of PDs 40 are provided, each coupled via a separate pair of twisted wire pairs 30 to a respective PSE 60.

A data pair is connected across the primary winding of each data transformer 50 in PD 40 and a second end of each twisted wire pair 30 is connected across the secondary winding of each data transformer 50 in PD 40 via respective connections, listed conventionally in two groups: connections 1, 2, 3, 6; and connections 4, 5, 7 and 8. The inputs of first diode bridge 65 are respectively connected to the center taps of the secondary windings of data transformers 50 of PD 40 connected to twisted wire pairs 30 via connections 1, 2, 3 and 6. The inputs of second diode bridge 65 are respectively connected to the center taps of the secondary windings of data transformers 50 of PD 40 connected to twisted wire pairs 30 via connections 4, 5, 7 and 8. The positive outputs of first and second diode bridges 65 are commonly connected to the positive input of PD interface 70, and the returns of first and second diode bridges 65 are commonly connected to the return of PD interface 70. PD interface 70 is illustrated as having a pass through connection from the positive input to the positive output thereof, and power for each of UVLO circuit 100, signature impedance 110 and class current source 120 are provided therefrom (not shown). PD interface 70 is illustrated as having a pass through connection from the return input to the return output thereof, and a return for each of UVLO circuit 100, signature impedance 110 and class current source 120 are provided therefrom (not shown). Electronically controlled switch 80 is arranged to provide a switchable connection between the return of PD load circuitry 90 and the return of PD interface 70, and electronically controlled switch 80 is responsive to an output of UVLO circuit 100, indicative that received power is reliable and is denoted PG. The positive input of PD load circuitry 90 is connected to the positive output of PD interface 70.

Powering arrangement 10 has been illustrated in an embodiment wherein electronically controlled switch 80 is connected in the return path, however this is not meant to be limiting in any way and in another embodiment electronically controlled switch 80 is connected in the power path. Similarly, PSE 60 is illustrated as being part of switch/hub 20 however this is not meant to be limiting in any way, and midspan equipment may be utilized to provide a connection for PSE 60 without exceeding the scope. PSE 60 may be any equipment arranged to provide power over communication cabling, including equipment meeting the definition of a PSE under any of IEEE 802.3af; IEEE 802.3at; and the above mentioned HDBaseT specification, without limitation.

In operation, electronically controlled switch 80 is initially set to isolate PD load circuitry 90 from PSE 60. Each of first PSE 60 and second PSE 60 acts to detect PD 40 utilizing detection functionality 180 in cooperation with signature impedance 110 presented by PD interface 70. Each PSE 60 detects a valid PD in the event that resistance is determined to be within a predetermined range, and that capacitance is below a predetermined maximum. After detection, PSE 60 presents a classification voltage to PD 40 utilizing classification functionality 140, and class current source 120 is arranged to drive a predetermined current indicative of the power requirements of PD load circuitry 90 responsive to the presented classification voltage, thus indicating to PSE 60 the power requirements thereof. The amount of current is detected by classification functionality 140 and information regarding the determined class of PD 40 is stored on PSE memory 150.

Preferably, as will be described below in relation to PD interface 200 of FIG. 2, PSE 60 further provides PD 40 with information regarding the powering ability of PSE 60 by providing a plurality of classification events separated by mark events, with the information provided by the number of classification events. The mark events function to define the individual classification events. A class event counter, if supplied, is arranged to count the classification events and output information regarding the counted classification events to PD load circuitry 90, thus providing PD load circuitry 90 with information regarding the powering ability of the PSEs 60.

Control circuitry 170 of each PSE 60 is further arranged, in the event that sufficient power is available to support the power requirements detected and output by classification functionality 140, to provide operating power for PD 40 over the respective associated set of twisted wire pairs 30 of structured cable 35 by raising the voltage above the classification voltage range, the power supplied from the respective power source input 130. In one embodiment, power source input 130 is coupled to an AC/DC converter coupled to an AC power mains. In another embodiment, power source input is coupled to a DC power source, such as a battery.

First and second diode bridges 65 are each arranged to ensure that power received by PD interface 70 and PD load circuitry 90 is at a predetermined polarity irrespective of the connection polarity of PSE 60. UVLO circuit 100 is arranged to maintain isolation between PSE 60 and PD load circuitry 90 until a predetermined operating voltage has been achieved across PD interface 70, and upon sensing the predetermined operating voltage UVLO circuit 100 is further arranged to assert output PG thus closing electronically controlled switch 80 thereby providing power to PD load circuitry 90. Optionally, a timer (not shown) may be provided to ensure that the startup phase is complete prior to closing electronically controlled switch 80.

In the event of a power outage, PSE timing functionality 160 is arranged to determine the length of the power outage, i.e. the length of the time period wherein power source input 130 did not receive power. In one embodiment, where PSE timing functionality 160 is supplied with enough backup power to operate during a power interrupt, is arranged to detect the beginning and the end of the power outage by comparing the operational voltage at power source input 130 to a predetermined threshold value. Power outage is defined as whenever the operational voltage at power source input 130 is less than the predetermined threshold value. At both the beginning and the end of the power outage, PSE timing functionality 160 is arranged to create a time stamp. At the end of the power outage, PSE timing functionality 160 is arranged to determine the difference between the time stamp created at the end of the power outage and the time stamp created at the beginning of the power outage, thus measuring the length of the power outage. Such an embodiment, where the length of the power outage is measured responsive to the difference between time stamps, is possible only if there is back up power which is sufficient to operate PSE timing functionality 160.

In another embodiment, as illustrated in FIG. 1C, capacitor CT is maintained in a fully charged state by the power received at power source input 130. During a power outage, capacitor CT begins to discharge at a known rate through resistor RT, since power source input 130 is assumed to be at a common potential. When the power outage ends, voltage detection circuitry 190, upon power up, is arranged to detect the voltage across capacitor CT. Voltage detection circuitry 190 is arranged to output the detected voltage value to PSE control circuitry 170 and PSE control circuitry 170 is arranged to determine the length of the power outage responsive to the value of the voltage across capacitor CT when power is being received at power source input 130. Optionally, in the event that enough power exists during the power outage to operate PSE timing functionality 160, the time period is determined responsive to time stamps, as described above. In the event that no power is available to power PSE timing functionality 160, the time period is determined responsive to the voltage across capacitor CT, as described above.

When power is resumed after a power outage, PSE control circuitry 170 is arranged to determine whether the length of the power outage was greater than a predetermined time value. In the event that the length of the power outage was not greater than the predetermined time value, PSE control circuitry 170 is arranged to provide power to PD 40 responsive to the classification information stored on PSE memory 150. Particularly, the predetermined time value is selected as a short enough time period where it can be assumed that the same PD 40 that was connected to PSE 60 before the power outage is still connected. As a result, no classification stage is necessary since the classification information of PD 40 is stored on PSE memory 150, as described above. In one embodiment, PSE control circuitry 170 is arranged to provide power to PD 40 after controlling detection functionality 180 to determine that a valid PD is coupled thereto, as described above. In another embodiment, PSE control circuitry 170 is arranged to provide power to PD 40 immediately after the power outage ends without performing the detection stage since during such a short period of time it can be assumed that PD 40 was not disconnected from twisted wire pairs 30. In yet another embodiment a shortened detection is performed, which only detects the presence of a load, i.e. a non-open condition, for example a load with an impedance of less than 100 Kohms.

In the event that the length of the power outage was greater than the predetermined time value, it is no longer known if PD 40 is still connected to twisted wire pairs 30 and PSE control circuitry 170 is arranged to control detection functionality 180 and classification functionality 140 to perform the respective detection and classification stages.

In one embodiment, responsive to the resumption of power to power source input 130, PSE control circuitry 170 is arranged to determine if power is still being supplied to PD 40. Particularly, in the event that the power outage is very short, the power supply to PD 40 may not be interrupted. As a result, it is not necessary to perform any of the above steps since the power supply was not interrupted.

In one embodiment, as will be described below, PD 40 is arranged to store the type information of PSE 60 on a memory and operate after a short power outage responsive to the stored PSE type information.

In one embodiment, during an installation process for switch/hub 20 and/or of PSE 60, a flag is set. As a result of the set flag, the above mentioned short power outage process is not accomplished during installation, when multiple restarts, sometimes of short duration, may occur. If no flag was present, PSE control circuitry 170 may detect that there was previously a power outage and may additionally detect that the length of the power outage was less the predetermined time value. This may occur for example during an initial installation phase when power is being set up and may not yet be stable, or may be reset numerous times, or various PDs may be being installed and disconnected. As a result, PSE 60 will provide power over twisted wire pairs 30 without performing the classification stage and optionally without performing the detection stage, which is not desirable. Responsive to the detection of the set flag, PSE control circuitry 170 knows that it is in an initial start-up phase and does not take actions associated with short power outages. Upon completion of the installation, the flag is cleared, thus allowing for the herein described advantageous quick restart after a short power outage.

Figure 2:
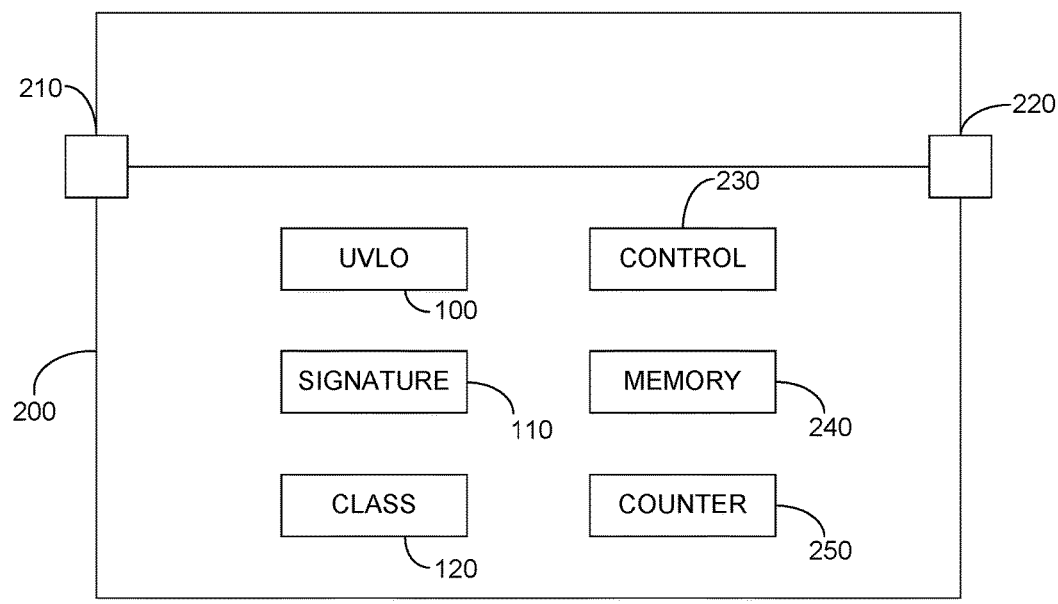
FIG. 2 illustrates a high level block diagram of an embodiment of a PD interface, according to certain embodiments.

FIG. 2 illustrates a high level block diagram of a PD interface 200, according to certain embodiments. PD interface 200 comprises: a PD power input 210; a PD power output 220; a UVLO circuit 100; a signature impedance 110; a class current source 120; a PD control circuitry 230; a PD memory 240; and a class event counter 250. In one embodiment, PD memory 240 is a non-volatile memory. In another embodiment, PD memory 240 is arranged to maintain data for a predetermined time period in the absence power. PD power input 210 is coupled to one or more diode bridges 65 (not shown), as described above in relation to PoE powering arrangement 10. Additionally, PD power input 210 is coupled to PD load circuitry 90 (not shown) described above, via PD power output 220.

The operation of PD interface 200 is in all respects similar to the operation of PD interface 70 described above, with the exception that PD control circuitry 230 is arranged to receive information regarding the type of PSE 60 and store the PSE type information on PD memory 240. Particularly, the operation of UVLO circuit 100, signature impedance 110 and class current source 120 are as described above. As further described above, PSE 60 further provides PD 40 with information regarding the powering ability of PSE 60 by providing a plurality of classification events separated by mark events, with the information provided by the number of classification events. The mark events function to define the individual classification events. Class event counter 250 is arranged to count the classification events and output information regarding the counted classification events to PD control circuitry 230. PD control circuitry 230 outputs the counted classification events to PD load circuitry 90 and further stores the information on PD memory 240.

In the event that PD control circuitry 230 detects that a plurality of classification events have been received at PD power input 210, PD control circuitry 230 is arranged to update the PSE type information stored on PD memory 240 responsive to the output of class event counter 250. In the event power is received at PD power input 210 and no classification signal is detected, PD control circuitry 230 is arranged to not update the PSE type information stored on PD memory 240. Particularly, PD control circuitry 230 is arranged to output to PD load circuitry 90 the PSE type information which is stored on PD memory 240. Since, as described above, PSE 60 provides power to PD 40 with no classification signal only when there was a power outage whose length was less than the predetermined time value, the PSE type information stored on PD memory 240 is thus the PSE type information received before the power outage. In summary, in the event of a short power outage PD load circuitry 90 receives the PSE type information received from before the power outage and in the event of a long power outage PD load circuitry 90 receives updated PSE type information from after the power outage. Preferably, PD memory 240 maintains data for at least the longest time for which quick restart after a short power outage is allowed. In the event that PD memory 240 is unable to maintain the data, PD 40 will not necessarily receive valid data regarding the PSE type information. Optionally, PD control circuitry 230 notifies PD 40 that the valid information regarding the PSE type is not available, and PD 40 ensures that power drawn does not exceed a value associated with a minimum PSE type.

Figure 3:
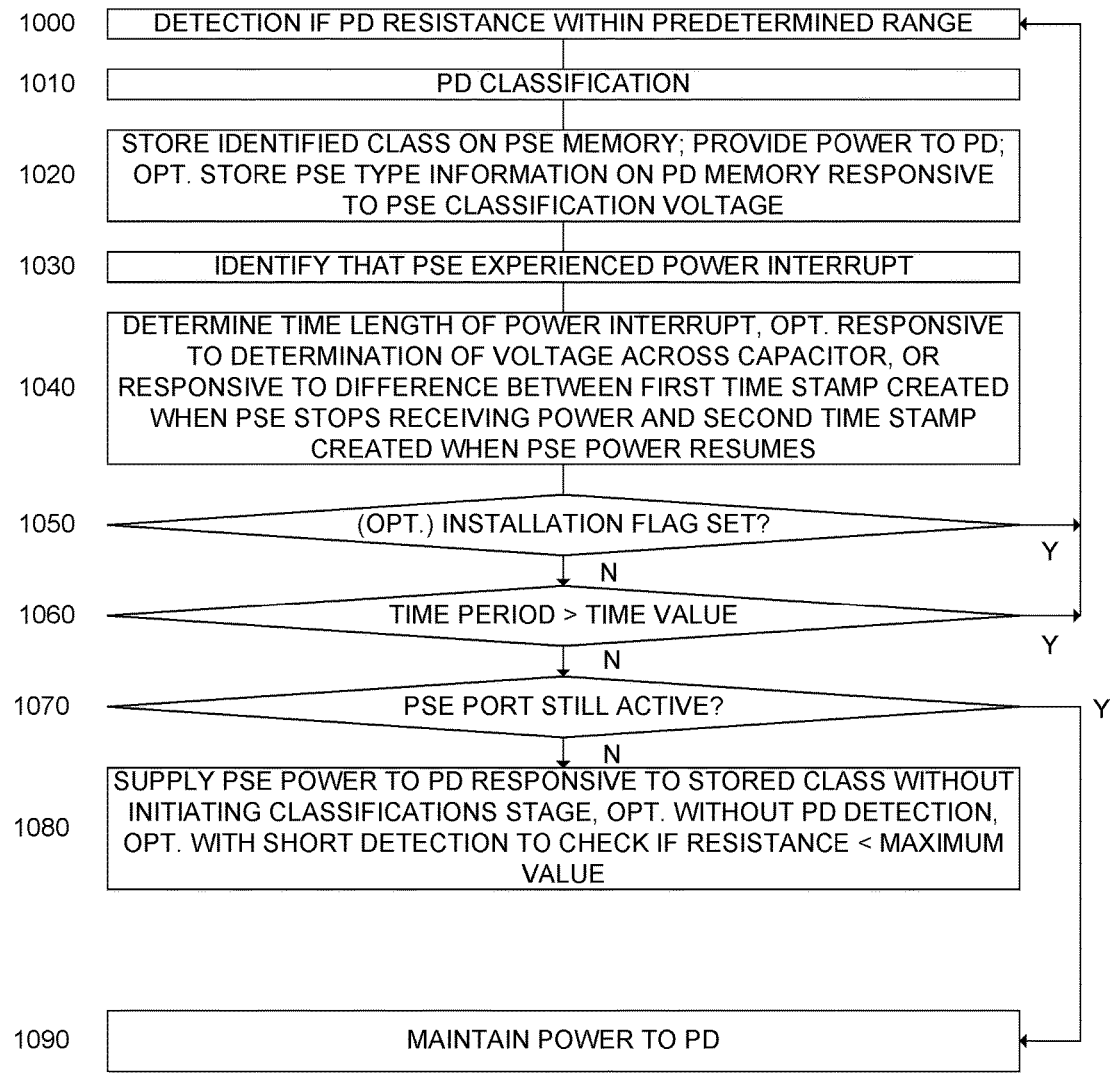
FIG. 3 illustrates a high level flow chart of a PoE powering method, according to certain embodiments.

FIG. 3 illustrates a high level flow chart of a PoE method, according to certain embodiments. In stage 1000, detection of a valid PD is performed by a PSE on each port to determine whether the signature resistance presented to the PSE port by the PD is within a predetermined range. In the event that the detected signature resistance is within the predetermined range, in stage 1010 a classification stage is performed by the PSE on each port for which detection has successfully been accomplished, the classification stage arranged to identify the class of the PD in electrical communication with the PSE port. In stage 1020, the identified PD class is stored on a PSE memory and power is provided to the PD by the PSE responsive to the stored identified PD class. Optionally, the PSE is arranged to transmit an indication of its type to the PD, by adjusting the voltage of the classification stage of stage 1010. Optionally, the PD is arranged to store the transmitted indication on a PD memory.

In stage 1030, the existence of an interruption of power at the PSE is detected, i.e. detection of power returning after a power interrupt. In stage 1040, responsive to the power interruption detection of stage 1030, the length of the power interruption, i.e. the amount of time that the PSE did not receive power, is determined. Optionally, the length of the power interruption is determined responsive to a determination of a voltage across a capacitor. As described above, the voltage across the capacitor decreases as a known function of the length of the power outage. In one embodiment, the capacitor is part of an RC circuit. Alternately, a first time stamp is created responsive to the PSE of stage 1000 not receiving power and a second time stamp is created when power is resumed, the power interruption length being responsive to a difference between the created second time stamp and the created first time stamp. In one further embodiment an interrupt is generated when the lack of received power is experienced, thereby storing the first time stamp.

In optional stage 1050, the status of an installation flag is checked. In the event that the installation flag is set, this means that the detected resumption of power is part of an installation process, and rapid restart may be problematic. In such an event, stage 1000 described above is again performed. In the event that the installation flag is not set, in stage 1060 the determined power interruption length of stage 1040 is compared to a predetermined time value. In the event that the determined power interruption length of stage 1040 is greater than the predetermined time value, stage 1000 is again performed.

In the event that the determined power interruption length of stage 1060 is not greater than the predetermined time value, in stage 1070 the PSE ports are checked to determine if they are still active, i.e. if power is still being provided to the PD. This may occur, for example, when the actual PSE powering circuits have not yet shut down despite the fact the PSE control circuitry has experienced a short power interrupt. In the event that PSE ports are no longer active, i.e. power supply to the PD was interrupted due to the power interruption to the PSE, in stage 1080 PSE power is supplied to the PD responsive to the stored class of stage 1020. Particularly, the classification stage as described above in relation to stage 1010 is not performed and power is supplied to the PD responsive to the stored class information. Optionally, the PD detection of stage 1000 is also not performed. Optionally, a short detection is performed to determine if the presented signature resistance is less than a maximum value, so as to ensure that the PSE port is not facing an open connection.

In the event that in stage 1070 it is determined that the PSE port is still active, i.e. power is still being provided to the PD, in stage 1090 the power supply to the PD is maintained.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A power over Ethernet (PoE) system, comprising a power sourcing equipment (PSE) in electrical communication with a powered device (PD), said PSE comprising:
   a PSE control circuitry;
   a power source input arranged to receive an input power;
   a classification functionality, responsive to said PSE control circuitry and arranged to identify a class of the PD;
   a PSE memory; and
   a PSE timing functionality in communication with said PSE control circuitry and arranged to output an indication of the length of an interruption in receipt of the input power to said power source input,
   wherein said PSE control circuitry is arranged to:
      control said classification functionality to identify, prior to the power interruption, the class of the PD;
      store information regarding said identified class of the PD on said PSE memory; and
      supply power to the PD, responsive to said identified class, prior to the power interruption,
   wherein, responsive to said indication of said PSE timing functionality that the power interruption length was greater than a predetermined time value, said PSE control circuitry is arranged to:
      control said classification functionality to identify, subsequent to the power interruption, the class of the PD; and
      supply power to the PD, subsequent to the power interruption, responsive to said subsequent identified class of the PD, and
   wherein, responsive to said indication of said PSE timing functionality that the power interruption length was not greater than said predetermined time value, said PSE control circuitry is arranged to:
      supply power to the PD, subsequent to the power interruption, responsive to said stored identified class; and
      not initiate said class identification of said classification functionality prior to said power supplying.

2. The system of claim 1, wherein said PSE further comprises a detection functionality in electrical communication with said PSE control circuitry and arranged to detect whether a PD having a resistance within a predetermined range, denoted a valid PD, is connected to the PSE, said PSE control circuitry further arranged to:
   responsive to said indication of said PSE timing functionality that the power interruption length was greater than said predetermined value, control said detection functionality to initiate said valid PD detection prior to said supply of power to the PD subsequent to the power interruption, and
   responsive to an indication of said PSE timing functionality that the power interruption length is not greater than said predetermined value, not initiate said valid PD detection of said detection circuitry prior to said supply of power to the PD subsequent to the power interruption.

3. The system of claim 1, wherein said PSE control circuitry is further arranged to determine the status of an installation flag,
   wherein said supply of power without said class determination is responsive to said installation flag being in a cleared state.

4. The system of claim 1, wherein said PSE timing functionality comprises a capacitor, said PSE timing functionality arranged to determine the voltage across said capacitor, wherein said power interruption length determination is responsive to said determined voltage.

5. The system of claim 1, wherein said PSE timing functionality is further arranged to:
   create a first time stamp responsive to a detection of the power interruption; and
   create a second time stamp responsive to a detection of an end of the power interruption,
   wherein said power interruption length determination is responsive to a difference between said created second time stamp and said created first time stamp.

6. The system of claim 1, further comprising the PD, said PD comprising:
   a PD power input arranged to receive power from said PSE;
   a PD memory; and
   a PD control circuitry,
   wherein said PD control circuitry is arranged, responsive to said class determination, to store information regarding a type of said PSE on said PD memory.

7. A remote powering method, the method comprising:
   identifying, prior to a power interruption event, the class of a powered device (PD) in electrical communication with a power sourcing equipment (PSE);
   storing information regarding said identified PD class on a PSE memory;
   supplying power to the PD, prior to the power interruption event, responsive to the identified PD class;
   determining the length of the power interruption event;
   in the event that said determined power interruption length is greater than a predetermined time value:
      identifying, subsequent to the power interruption event, the class of the PD; and
      supplying power to the PD, subsequent to the power interruption event, responsive to said subsequent identified class of the PD,
   in the event that the power interruption length is not greater than said predetermined time value:
      supplying power to the PD, subsequent to the power interruption, responsive to said stored identified class, without identifying, subsequent to the power interruption event, the class of the PD.

8. The method of claim 7, further comprising:
   in the event that said determined power interruption length is greater than said predetermined time value, initiating a detection stage to identify that a PD having a resistance within a predetermined range is in electrical communication with the PSE, prior to said supplying power to the PD subsequent to the power interruption event; and
   in the event that the power interruption length is not greater than said predetermined time value, said supplying power to the PD subsequent to the power interruption event is without initiating the detection stage subsequent to the power interruption event.

9. The method of claim 7, further comprising:
   determining the status of an installation flag, wherein said supplying power to the PD, subsequent to the power interruption, responsive to said stored identified class, without identifying, subsequent to the power interruption event, the class of the PD, is responsive to said installation flag being in a cleared state.

10. The method of claim 7, further comprising determining a voltage across a capacitor, said power interruption length determination responsive to said determined voltage.

11. The method of claim 7, further comprising:
    creating a first time stamp responsive to a detection of a beginning of the power interruption event; and
    creating a second time stamp responsive to a detection of an end of the power interruption event,
    wherein said power interruption length determination is responsive to a difference between said created second time stamp and said created first time stamp.

12. The method of claim 7, further comprising, responsive to said identifying, prior to the power interruption event, the class of the PD:
    storing information regarding a type of the PSE on a PD memory.

* * * * *